(12) United States Patent
Hori et al.

(10) Patent No.: US 7,276,558 B2
(45) Date of Patent: *Oct. 2, 2007

(54) POLYMER COMPOSITION AND FILM THEREOF

(75) Inventors: Hideaki Hori, Sodegaura (JP); Takeshi Ebara, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 197 days.

This patent is subject to a terminal disclaimer.

(21) Appl. No.: 10/920,274

(22) Filed: Aug. 18, 2004

(65) Prior Publication Data

US 2005/0080192 A1    Apr. 14, 2005

(30) Foreign Application Priority Data

Aug. 20, 2003  (JP)  ............................. 2003-208001
Aug. 20, 2003  (JP)  ............................. 2003-208002

(51) Int. Cl.
  *C08L 23/00*  (2006.01)
  *C08L 23/04*  (2006.01)
(52) U.S. Cl. ..................................... 525/191; 525/240
(58) Field of Classification Search ................ 525/191, 525/240
  See application file for complete search history.

(56) References Cited

U.S. PATENT DOCUMENTS

| 4,642,269 | A | * | 2/1987 | Kohyama et al. ........... 428/516 |
| 4,734,328 | A |  | 3/1988 | Kohyama et al. |
| 5,702,784 | A | * | 12/1997 | Nishimura et al. ......... 428/34.9 |
| 6,818,703 | B2 | * | 11/2004 | Ebara et al. ................. 525/191 |
| 6,822,049 | B2 | * | 11/2004 | Ebara et al. ................. 525/191 |
| 6,835,791 | B2 | * | 12/2004 | Ebara et al. ............. 526/348.1 |
| 2003/0187126 | A1 | * | 10/2003 | Ebara et al. ................. 524/515 |
| 2003/0220453 | A1 |  | 11/2003 | Ebara et al. |

FOREIGN PATENT DOCUMENTS

| JP | 55-59964 A | 5/1980 |
| JP | 61-108647 A | 5/1986 |
| JP | 11-245355 A | 9/1999 |
| JP | 2004-2760 A | 1/2004 |
| JP | 2004-2762 A | 1/2004 |

* cited by examiner

*Primary Examiner*—Nathan M. Nutter
(74) *Attorney, Agent, or Firm*—Sughrue Mion, PLLC

(57) ABSTRACT

Disclosed is a polymer composition comprising a copolymer of propylene, a specific amount of α-olefin having 4 or more carbon atoms and optionally a specific amount of ethylene and a specific 1-butene homopolymer or copolymer having a melting point of not lower than 60° C. but lower than 125° C., wherein the polymer composition contains a 20° C. xylene-soluble portion of the polymer composition in an amount of from 5 to 45% by weight and the 20° C. xylene-soluble portion has an intrinsic viscosity of 1.3 dl/g or higher. The polymer composition may optionally contain a specific propylene copolymer and/or a specific propylene homopolymer or copolymer having a melting point of from 150° C. to 170° C.

5 Claims, No Drawings

POLYMER COMPOSITION AND FILM THEREOF

BACKGROUND OF THE INVENTION

1. Field of the Invention

The present invention relates to polymer compositions and to their films. Particularly, the invention relates to polymer compositions from which films superior in low-temperature heat sealability, hot tack property and transparency can be produced and also relates to their films. In addition, the invention relates to polymer compositions from which films superior in low-temperature heat sealability, hot tack property and transparency can be obtained and which exhibit less tackiness when being fabricated into films and the invention also relates to their films.

2. Description of the Related Art

Films or sheets obtained by shaping polypropylene have been used widely in the field, particularly, of packaging of foods or the like due to their superior transparency, heat resistance, food sanitation and the like.

JP-A-55-59964 discloses a film that has a lowered heat seal temperature and an increased heat seal strength and that is not affected with respect to other properties films are required to possess. Specifically disclosed is a polypropylene multilayer film in which a layer of a mixture composed of from 85 to 97 parts by weight of a propylene-butene-1 copolymer having a butene-1 content of from 10 to 25% by weight and from 3 to 15 parts by weight of a propylene-butene-1 copolymer having a butene-1 content of from 80 to 93%.

JP-A-61-108647 discloses a crystalline propylene random copolymer composition from which a polypropylene composite laminate superior in low-temperature heat sealability and heat seal strength can be obtained. Specifically disclosed is a crystalline propylene random copolymer composition comprising a crystalline propylene random copolymer which is made up of propylene and α-olefin other than propylene and which contains the propylene as a main component and a 1-butene random copolymer made up of ethylene and 1-butene.

In recent years, in the field of packaging of foods and the like, the fabrication speed of bags has been increased and a material which can be processed at an increased fabrication speed is awaited. For the propylene copolymer compositions, a further improvement in low-temperature heat sealability, hot tack property and transparency of films obtained from the compositions is awaited. Moreover, an improvement in tackiness of the compositions during film formation is also awaited.

SUMMARY OF THE INVENTION

An object of the present is to provide a polymer composition from which a film superior in low-temperature heat sealability, hot tack property and transparency can be afforded and to provide a film thereof. Another object of the present invention is to provide a polymer composition from which films superior in low-temperature heat sealability, hot tack property and transparency can be obtained and which exhibit less tackiness when being fabricated into films and to provide a film thereof.

In a first embodiment, the present invention is directed to a polymer composition comprising:
from 70 to 99% by weight of a polymer (A) satisfying Requirements (A-1) through (A-3) defined below and from 1 to 30% by weight of a polymer (B) satisfying Requirements (B-1) and (B-2) defined below, the polymer composition satisfying Requirements (1) and (2) defined below, wherein said amounts of the polymers (A) and (B) are based on a combined amount of the polymers (A) and (B):

Requirement (1): the content of a 20° C. xylene-soluble portion of the polymer composition is from 5 to 45% by weight, Requirement (2): a 20° C. xylene-soluble portion of the polymer composition has an intrinsic viscosity of 1.3 dl/g or higher, Requirement (A-1): the polymer is a copolymer of propylene and α-olefin having 4 or more carbon atoms or a copolymer of propylene, α-olefin having 4 or more carbon atoms and ethylene, Requirement (A-2): the polymer has a content of structural units derived from α-olefin having 4 or more carbon atoms of from 3 to 40% by weight, Requirement (A-3): the polymer has a content of structural units derived from ethylene of from 0.1 to 5% by weight when the polymer is a copolymer of propylene, α-olefin having 4 or more carbon atoms and ethylene, Requirement (B-1): the polymer is a homopolymer of 1-butene, a copolymer of 1-butene and ethylene, a copolymer of 1-butene and propylene, a copolymer of 1-butene and α-olefin having 4 or more carbon atoms other than 1-butene, a copolymer of 1-butene, ethylene and propylene or a copolymer of 1-butene, ethylene and α-olefin having 4 or more carbon atoms other than 1-butene, and Requirement (B-2): the polymer has a melting point of not lower than 60° C. but lower than 125° C.

In a second embodiment, the present invention is directed to a polymer composition according to the first embodiment, wherein the polymer composition further comprises from 1 to 25 parts by weight, based on 100 parts by weight of the polymers (A) and (B) in total, of a polymer (D) satisfying Requirements (D-1), (D-2) and (D-3) defined below:

Requirement (D-1): the polymer is a homopolymer of propylene, a copolymer of propylene and ethylene, or a copolymer of propylene and α-olefin having 4 or more carbon atoms, Requirement (D-2): the polymer has a melting point of from 150° C. to 170° C., and Requirement (D-3): the polymer has a content of structural units derived from ethylene of from 0.1 to 3% by weight when the polymer is a copolymer of propylene and ethylene or the polymer has a content of structural units derived from α-olefin having 4 or more carbon atoms of from 0.1 to 3% by weight when the polymer is a copolymer of propylene and α-olefin having 4 or more carbon atoms.

In a third embodiment, the present invention is directed to a polymer composition comprising:
from 30 to 98% by weight of a polymer (A) satisfying Requirements (A-1) through (A-3) defined above,
from 1 to 30% by weight of a polymer (B) satisfying Requirements (B-1) and (B-2) defined above, and
from 1 to 50% by weight of a polymer (C) satisfying Requirements (C-1) through (C-5) defined below, the polymer composition satisfying Requirements (1) and (2) defined above, wherein said amounts of the polymers (A), (B) and (C) are based on a combined amount of the polymers (A), (B) and (C):

Requirement (C-1): the polymer is a copolymer of propylene and ethylene, a copolymer propylene and α-olefin having 4 or more carbon atoms, or a copolymer of propylene, ethylene and α-olefin having 4 or more carbon atoms, Requirement (C-2): the polymer has a content of structural units derived from ethylene of from 0.1 to 10% by weight when the polymer is a copolymer of propylene and ethylene or a copolymer of propylene, ethylene and α-olefin having 4 or more carbon atom, wherein this content is based on the weight of the polymer, Requirement (C-3): the polymer has a content of structural units derived from α-olefin having 4 or more carbon atoms of from 0.1 to 10% by weight when the polymer is a propylene and α-olefin having 4 or more carbon atoms or a copolymer of propylene, ethylene and α-olefin having 4 or more carbon atoms, Requirement (C-4): the polymer has a content, based on the weight of the polymer, of structural units derived from α-olefin having 4 or more carbon atoms less than that of polymer (A) when the polymer is a copolymer of propylene and α-olefin having 4 or more carbon atoms or a copolymer of propylene, ethylene and α-olefin having 4 or more carbon atoms, and Requirement (C-5): the polymer has a melting point of not lower than 125° C. but lower than 150° C.

In a fourth embodiment, the present invention is directed to a polymer composition according to the third embodiment, wherein the polymer composition further comprises from 1 to 25 parts by weight, based on 100 parts by weight of the polymers (A), (B) and (C) in total, of a polymer (D) satisfying Requirements (D-1), (D-2) and (D-3) defined above.

In the polymer compositions of the first through fourth embodiments, the polymer (A) is a copolymer of propylene and 1-butene.

In the polymer compositions of the third and fourth embodiments, the polymer (C) is a copolymer of propylene and ethylene or a copolymer of propylene, ethylene and 1-butene.

In the polymer compositions of the second and fourth embodiments, the polymer (D) is a homopolymer of propylene having a melting point of from 155° C. to 170° C.

Moreover, the present invention also provides a film having at least one layer made of any of the polymer compositions mentioned above.

DESCRIPTION OF THE PREFERRED EMBODIMENTS

The polymer composition of the first embodiment of the present invention is a polymer composition comprising from 70 to 99% by weight of the polymer (A) and from 1 to 30% by weight of the polymer (B), the polymer composition satisfying Requirements (1) and (2) defined below, wherein said amounts of the polymers (A) and (B) are based on a combined amount of the polymers (A) and (B):

Requirement (1): the content of a 20° C. xylene-soluble portion of the polymer composition is from 5 to 45% by weight, and Requirement (2): a 20° C. xylene-soluble portion recovered from the polymer composition has an intrinsic viscosity of 1.3 dl/g or higher.

The polymer composition of the second embodiment of the present invention is a polymer composition of the first embodiment which further comprises from 1 to 25 parts by weight, based on 100 parts by weight of the polymers (A) and (B) in total, of the polymer (D).

The polymer composition of the third embodiment of the present invention is a polymer composition comprising from 30 to 98% by weight of the polymer (A), from 1 to 30% by weight of the polymer (B), and from 1 to 50% by weight of the polymer (C), the polymer composition satisfying Requirements (1) and (2) defined above, wherein said amounts of the polymers (A), (B) and (C) are based on a combined amount of the polymers (A), (B) and (C).

The polymer composition of the fourth embodiment of the present invention is a polymer composition of the third embodiment which further comprises from 1 to 25 parts by weight, based on 100 parts by weight of the polymers (A), (B) and (C) in total, of the polymer (D).

The content of a 20° C. xylene-soluble portion (henceforth, referred to as CXS) of the polymer compositions of the present invention is from 5 to 45% by weight (Requirement (1)) and, from the viewpoints of preventing polymer compositions from exhibiting tackiness during their film formation and low-temperature heat sealability of resulting films, preferably is from 10 to 40% by weight.

In the polymer compositions of the present invention, the intrinsic viscosity of the CXS (henceforth, referred to as $[\eta]CXS$) is 1.3 dl/g or higher (Requirement (2)), preferably from 1.3 to 7 dl/g and, from the viewpoint of hot tack strength, is more preferably from 1.34 to 7 dl/g, particularly preferably from 1.38 to 5 dl/g. It should be noted that the $[\eta]CXS$ in the present invention is measured in tetralin at 135° C. For the measurement, an Ubbelohde's viscometer is used.

The melt flow rate (MFR), measured at 230° C., of the polymer compositions of the present invention is, from the viewpoints of fluidity and film formability, usually from 0.1 to 50 g/10 minutes, preferably from 1 to 20 g/10 minutes, more preferably from 3 to 15 g/10 minutes, and even more preferably from 4 to 15 g/10 minutes.

In the polymer compositions of the first and second embodiments of the present invention, the content of the polymer (A) and that of the polymer (B) are from 70 to 99% by weight and from 1 to 30% by weight, respectively and, from the viewpoint of preventing polymer compositions from exhibiting tackiness during their film formation, preferably from 75 to 99% by weight and from 1 to 25% by weight, respectively and more preferably from 80 to 97% by weight and from 3 to 20% by weight, respectively.

In the polymer compositions of the third and fourth embodiments of the present invention, the content of the polymer (A), that of the polymer (B) and that of the polymer (C) are from 30 to 98% by weight, from 1 to 30% by weight and from 1 to 50% by weight, respectively and, from the viewpoints of preventing polymer compositions from exhibiting tackiness during their film formation and low-temperature heat sealability of resulting films, preferably from 40 to 98% by weight, from 1 to 25% by weight and from 1 to 45% by weight, respectively and more preferably from 50 to 96% by weight, 3 to 20% by weight and from 1 to 40% by weight, respectively.

The polymer (A) used in the present invention is a copolymer of propylene and α-olefin having 4 or more carbon atoms or a copolymer of propylene, α-olefin having 4 or more carbon atoms and ethylene (Requirement (A-1)).

The content of structural units derived from α-olefin having 4 or more carbon atoms is from 3 to 40% by weight (Requirement (A-2)). From the viewpoints of preventing polymer compositions from exhibiting tackiness during their film formation and low-temperature heat sealability of resulting films, the content is preferably from 5 to 40% by weight, more preferably from 10 to 30% by weight, and even more preferably from 15 to 40% by weight. It should be noted that said contents are based on the combined weight of the structural units derived from propylene and the structural units derived from α-olefin having 4 or more carbon atoms in the polymer (A).

When the polymer (A) is a copolymer of propylene, α-olefin having 4 or more carbon atoms and ethylene, the content of structural units derived from ethylene is 0.1 to 5% by weight (Requirement (A-3)). From the viewpoints of preventing polymer compositions from exhibiting tackiness during their film formation and preventing films from whitening with time, the content is preferably up to 3% by weight. It should be noted that said contents are based on the total of the combined weight of the structural units derived from propylene, the structural units derived from ethylene and the structural units derived from α-olefin having 4 or more carbon atoms in the polymer (A).

The melt flow rate (MFR), measured at 230° C., of the polymer (A) is usually from 0.1 to 50 g/10 minutes and, from the viewpoint of fluidity, it is preferably from 1 to 20 g/10 minutes, more preferably from 3 to 15 g/10 minutes and even more preferably from 4 to 15 g/10 minutes.

It is possible to control the fluidity of the polymer (A) by changing its molecular weight by a conventional method. For example, it is possible to control the MFR of the polymer (A) by melt kneading it in the presence of an organic peroxide.

The α-olefin having 4 or more carbon atoms to be used for the preparation of the polymer (A) is preferably an α-olefin having from 4 to 20 carbon atoms and more preferably is an α-olefin having from 4 to 12 carbon atoms.

Examples of the α-olefin having 4 or more carbon atoms to be used for the preparation of the polymer (A) include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, 2-methyl-1-hexene, 2,3,-dimethyl-1-pentene, 2-ethyl-1-pentene, 2,3,4-trimethyl-1-butene, 2-methyl-3-ethyl-1-butene, 1-octene, 5-methyl-1-pentene, 2-ethyl-1-hexene, 3,3-dimethyl-1-hexene, 2-propyl-1-heptene, 2-methyl-3-ethyl-1-heptene, 2,3,4-trimethyl-1-pentene, 2-propyl-1-pentene, 2,3-diethyl-1-butene, 1-nonene, 1-decene, 1-undecene and 1-dodecene.

Preferred are 1-butene, 1-pentene, 1-hexene and 1-octene. From the viewpoint of copolymerizability and the economical standpoint, more preferred are 1-butene and 1-hexene.

Examples of the polymer (A) includes a propylene-1-butene copolymer, a propylene-1-hexene copolymer, a propylene-ethylene-1-butene copolymer and a propylene-ethylene-1-hexene copolymer. Preferred are a propylene-1-butene copolymer and a propylene-1-hexene copolymer.

The polymer (A) is preferably a polymer containing from 1 to 30% by weight of a segment (a-1) defined below and from 70 to 99% by weight of a segment (a-2) defined below, wherein said amounts of the segments are based on the combined weight of the segments:

segment (a-1): a segment having structural units derived from 1-butene in a content of not less than 1% by weight but less than 15% by weight, segment (a-2): a segment having structural units derived from 1-butene in a content of not less than 15% by weight but not more than 40% by weight.

From the viewpoint of properties of a powder during polymerization and also from the viewpoints of preventing polymer compositions from exhibiting tackiness during their film formation and low-temperature heat sealability of resulting films, the content of the segment (a-1) and that of the segment (a-2) are preferably from 1 to 20% by weight and from 80 to 99% by weight, respectively. The content of 1-butene in the segment (a-1) is preferably from 1 to 10% by weight. The content of 1-butene in the segment (a-2) is preferably from 15 to 30% by weight.

Examples of the segment (a-1) include a propylene-1-butene copolymer segment and a propylene-ethylene-1-butene copolymer segment. Preferred is a propylene-1-butene copolymer segment. Examples of the segment (a-2) also include a propylene-1-butene copolymer segment and a propylene-ethylene-1-butene copolymer segment. Preferred is a propylene-1-butene copolymer segment. The kinds of the structural units of the segment (a-1) and those of the structural units of the segment (a-2) may be either identical or different.

Examples of such a polymer (A) containing a segment (a-1) and a segment (a-2) include a (propylene-1-butene)-(propylene-1-butene) copolymer, a (proppylene-1-butene)-(propylene-ethylene-1-butene) copolymer, a (propylene-ethylene-1-butene)-(propylene-1-butene) copolymer, and a (propylene-ethylene-1-butene)-(propylene-ethylene-1-butene) copolymer. Preferred are a (propylene-1-butene)-(propylene-1-butene) copolymer and a (propylene-1-butene)-(propylene-1-butene) copolymer. More preferred is a (propylene-1-butene)-(propylene-1-butene) copolymer.

The polymer (B) to be used in the present invention is a homopolymer of 1-butene, a copolymer of 1-butene and ethylene, a copolymer of 1-butene and propylene, a copolymer of 1-butene and α-olefin having 4 or more carbon atoms other than 1-butene, a copolymer of 1-butene, ethylene and propylene, or a copolymer of 1-butene, ethylene and α-olefin having 4 or more carbon atoms other than 1-butene (Requirement (B-1)).

When the polymer (B) is a copolymer of 1-butene and α-olefin having 4 or more carbon atoms other than 1-butene, examples of the α-olefin include 1-pentene and 1-hexene.

When the polymer (B) is a copolymer of 1-butene and α-olefin having 4 or more carbon atoms other than 1-butene, examples of such a copolymer include a 1-butene-propylene copolymer, a 1-butene-ethylene copolymer and a 1-butene-propylene-ethylene copolymer. Preferred are a 1-butene-ethylene copolymer and a 1-butene-propylene copolymer.

When the polymer (B) is a copolymer, its content of structural units derived from 1-butene is usually from 55 to 99.9% by weight. From the viewpoint of preventing polymer compositions from exhibiting tackiness during their film formation, the content is preferably from 60 to 99.9% by weight and more preferably from 65 to 99.9% by weight.

When the polymer (B) is a copolymer, its content of structural units derived from monomers other than 1-butene is usually from 0.1 to 45% by weight, preferably from 0.1 to 40% by weight, and more preferably from 0.1 to 35% by weight.

The melting point (Tm) of the polymer (B) is not lower than 60° C. but lower than 125° C. (Requirement (B-2)). From the viewpoints of preventing polymer compositions from exhibiting tackiness during their film formation and low-temperature heat sealability of resulting films, the melting point is preferably from 65 to 120° C. and more preferably from 65 to 115° C.

The intrinsic viscosity [η] of the polymer (B) is preferably from 1.4 to 7 dl/g, more preferably from 1.5 to 6 dl/g and even more preferably from 1.6 to 5 dl/g from the viewpoints of hot tack strength of films and dispersibility of the polymer achieved during the pelletization of the composition.

The polymer (C) used in the present invention is a copolymer of propylene and ethylene, a copolymer propylene and α-olefin having 4 or more carbon atoms, or a copolymer of propylene, ethylene and α-olefin having 4 or more carbon atoms (Requirement (C-1)).

When the polymer (C) is a copolymer of propylene and ethylene or a copolymer of propylene, ethylene and α-olefin having 4 or more carbon atoms, the polymer has a content of structural units derived from ethylene of from 0.1 to 10% by weight (Requirement (C-2)). The content is preferably from 0.1 to 8% by weight and more preferably from 1 to 7% by weight.

When the polymer is a copolymer of propylene and ethylene or a copolymer of propylene, ethylene and α-olefin having 4 or more carbon atoms, the polymer must satisfy the aforementioned Requirement (C-2) from the viewpoint of properties of a powder during the polymerization for the production of the polymer (C) and also from the viewpoints of preventing polymer compositions from exhibiting tackiness during their film formation and low-temperature heat sealability of resulting films.

When the polymer (C) is a copolymer of propylene and α-olefin having 4 or more carbon atoms or a copolymer of propylene, ethylene and α-olefin having 4 or more carbon atoms, the polymer has a content of structural units derived from α-olefin having 4 or more carbon atoms of from 0.1 to 10% by weight (Requirement (C-3)), and preferably is from 1 to 8% by weight.

When the polymer (C) is a copolymer of propylene and α-olefin having 4 or more carbon atoms or a copolymer of propylene, ethylene and α-olefin having 4 or more carbon atoms, the polymer (C) has a content, based on the weight of the polymer, of structural units derived from α-olefin having 4 or more carbon atoms less than that of polymer (A) (Requirement (C-4)).

When the polymer (C) is a copolymer of propylene and α-olefin having 4 or more carbon atoms or a copolymer of propylene, ethylene and α-olefin having 4 or more carbon atoms, the polymer (C) must satisfy the aforementioned Requirements (C-3) and (C-4) from the viewpoint of properties of a powder achieved during the polymerization for the production of polymer (C) and also from the viewpoints of preventing polymer compositions from exhibiting tackiness during their film formation and low-temperature heat sealability of resulting films.

The melting point of the polymer (C) is not lower than 125° C. but lower than 150° C. (Requirement (C-5)). It is preferably from not lower than 125° C. but not higher than 145° C. from the viewpoint of properties of a powder achieved during the polymerization for the production of polymer (C) or low-temperature heat sealability of films.

The melt flow rate (MFR), measured at 230° C., of the polymer (C) is usually from 0.1 to 200 g/10 minutes and, from the viewpoints of fluidity and film formability, preferably from 1 to 150 g/10 minutes.

It is possible to control the fluidity of the polymer (C) by changing its molecular weight by a conventional method. For example, it is possible to control the MFR of the polymer (C) by melt kneading it in the presence of an organic peroxide.

In the polymer compositions of the first and second embodiments of the present invention, the content of the polymer (A) and that of the polymer (B) are preferably from 75 to 99% by weight and from 1 to 25% by weight, respectively, and more preferably from 80 to 97% by weight and from 3 to 20% by weight, respectively from the viewpoint of preventing polymer compositions from exhibiting tackiness during their film formation.

In the polymer compositions of the third and fourth embodiments of the present invention, the content of the polymer (A), that of the polymer (B) and that of the polymer (C) are preferably from 40 to 98% by weight, from 1 to 25% by weight and from 1 to 45% by weight, respectively, and more preferably from 50 to 96% by weight, from 3 to 20% by weight and from 1 to 40% by weight, respectively from the viewpoints of preventing polymer compositions from exhibiting tackiness during their film formation and low-temperature heat seal temperature of resulting films.

The polymer (D) to be used in the present invention is a homopolymer of propylene, a copolymer of propylene and ethylene, or a copolymer of propylene and α-olefin having 4 or more carbon atoms (Requirement (D-1)). From the viewpoints of preventing polymer compositions from exhibiting tackiness during their film formation, a homopolymer of propylene is preferred.

The melting point of the polymer (D) is from 150° C. to 170° C. (Requirement (D-2)). From the viewpoints of preventing polymer compositions from exhibiting tackiness during their film formation, it is preferably from 155° C. to 170° C., and more preferably from 158° C. to 170° C.

When the polymer (D) is a copolymer of propylene and ethylene, the polymer has a content of structural units derived from ethylene of from 0.1 to 3% by weight and when the polymer is a copolymer of propylene and α-olefin having 4 or more carbon atoms, the polymer has a content of structural units derived from α-olefin having 4 or more carbon atoms of from 0.1 to 3% by weight (Requirement (D-3)). From the viewpoints of preventing polymer compositions from exhibiting tackiness during their film formation, it is preferably from 0.1 to 2% by weight.

The melt flow rate (MFR), measured at 230° C., of the polymer (D) is usually from 0.1 to 200 g/10 minutes and, from the viewpoints of fluidity and film formability, preferably from 1 to 150 g/10 minutes.

It is possible to control the fluidity of the polymer (D) by changing its molecular weight by a conventional method. For example, it is possible to control the MFR of the polymer (D) by melt kneading it in the presence of an organic peroxide.

The content of the polymer (D) in a polymer composition containing no polymer (C) is from 1 to 25 parts by weight based on 100 parts by weight of the polymers (A) and (B) in total. From the viewpoint of hot tack strength, it is preferably from 1 to 18 parts by weight and more preferably from 1 to 12 parts by weight. On the other hand, the content of the polymer (D) in a polymer composition containing the polymer (C) is from 1 to 25 parts by weight based on 100 parts by weight of the polymers (A), (B) and (C) in total.

It is possible to produce the polymers (A), (C) and (D) by polymerizations using appropriate polymerization catalysts.

Examples of the catalyst for polymerization include Ziegler-Natta type catalysts and metallocene-type catalysts. Preferred are catalysts containing Ti, Mg and halogen as essential components. For example, Ti-Mg-based catalysts comprising a solid catalyst component obtained by compounding a magnesium compound with a titanium compound, and catalyst systems comprising such a solid catalyst component, an organoaluminum compound and a third component, e.g. an electron-donating compound, are mentioned. Specific examples are catalyst systems disclosed, for example, in JP-A-61-218606, JP-A-61-287904 and JP-A-7-216017.

Preferred examples of the organoaluminum compound include triethylaluminum, triisobutylaluminu, a mixture of triethylaluminu and diethylaluminum chloride, and tetraethyldialumoxane.

Preferred examples of the electron-donating compound include cyclohexylethyldimethoxysilane, tert-butyl-n-propyldimethoxysilane, tert-butylethyldimethoxysilane and dicyclopentyldimethoxysilane.

Examples of the type of polymerization include solvent polymerization using an inert solvent typified by hydrocarbon compounds such as hexane, heptane, octane, decane, cyclohexane, methylcyclohexane, benzene, toluene and xylene; bulk polymerization using liquid monomer as solvent; and gas phase polymerization carried out in vaporous monomer. Preferred are bulk polymerization and gas phase polymerization because post-treatment can be conducted easily. These polymerization may be carried out either in a batch manner or in a continuous manner.

When the polymer (A) is a copolymer containing the aforementioned segments (a-1) and (a-2), its production can be carried out by multistep polymerization comprising a first polymerization step and a polymerization step or steps following the first polymerization step.

The type of the polymerization used in the first polymerization step and that used in the following polymerization step or steps may be either the same or different. From the viewpoints of polymerization activity and ease in post-treatment, polymerization is carried out in the absence of inert solvent in the first polymerization step and polymerization is carried out in a gas phase in the step or steps following the first polymerization step. The polymerization in the first polymerization step and the polymerization in the step or each of the steps following the first polymerization step may be carried out either in the same polymerization reactor or in different polymerization reactors.

Examples of the multistep polymerization composed of the first polymerization step and a polymerization step or steps following the firs polymerization step include solvent-solvent polymerization, bulk-bulk polymerization, gas phase-gas phase polymerization, solvent-gas phase polymerization, bulk-gas phase-gas phase polymerization, solvent-gas phase-gas phase polymerization and bulk-gas phase-gas phase polymerization. Preferred are bulk-gas phase polymerization, gas phase-gas phase polymerization and bulk-gas phase-gas phase polymerization.

The polymerization temperature in the first polymerization step is usually from 20 to 150° C. and, from the viewpoints of production efficiency and ease in controlling the contents of the copolymer segments (a-1) and (a-2), preferably from 35 to 95° C.

The polymerization temperature in the step or each of the steps following the first polymerization step may be equal to or different from the polymerization temperature in the first polymerization step. However, it is usually from 20 to 150° C. and preferably from 35 to 95° C.

The preparation of the polymer (B) can be carried out by polymerization using a method widely employed in industrial production.

It is possible to produce the polymer compositions of the present invention by mixing ingredients prepared separately and then dispersing them uniformly. Examples of such a method include extrusion melt blending and Banbury blending.

In the preparation of the polymer compositions of the present invention, it is desirable to melt knead each of the polymers (A), (C) and (D) or mixtures thereof in the presence of an organic peroxide. However, it is undesirable to melt knead the polymer (B) or a mixture of the polymer (B) and other polymers.

The polymer compositions of the present invention may contain additives or a resin other than the polymers (A), (B), (C) and (D), if required. Examples of additives include antioxidants, UV absorbers, antistatic agents, lubricants, nucleating agents, adhesives, anticlouding agents and antiblocking agents.

The resin other than the polymers (A), (B), (C) and (D) may be polyethylene or the like.

The film of the present invention is a film having at least one layer made of any of the polymer compositions of the present invention described above. The film of the present invention may be either a film composed of a single layer or a multilayer film.

The method for producing the film of the present invention maybe a conventionally-used method such as the inflation method, the T die method and the calender method. The method for producing the multilayer film may be a conventionally-used method such as coextrusion, extrusion lamination, hot lamination and dry lamination.

The film of the present invention may be a drawn film. The method for producing the drawn film may be a method in which a film or sheet prepared by processing a polymer composition of the present invention is stretched. The method of the stretching may be a method of uniaxially or biaxially stretching a film or sheet by roll stretching, tenter stretching, tubular stretching, or the like.

The film of the present invention preferably is an undrawn film produced by coextrusion or a film produced by biaxially drawing from the viewpoints of balance between properties of the film including low-temperature heat sealability, transparency and rigidity.

Examples of the application of the film of the present invention include wrapping of various items. Examples of the items to be wrapped in the film of the present invention include foods and clothes. Foods are preferred.

EXAMPLES

The present invention will be described specifically below with reference to examples and compatible examples. However, the invention is not restricted to the examples. The methods for preparing the samples used in the examples and comparative examples and the methods for measuring physical properties are shown below.

(1) Content of structural units derived from 1-butene (unit: % by weight)

The IR spectrum was taken by a method described in Macromolecule Handbook (1995, published by Kinokuniya), page 619. Based on the spectrum, the content of structural units derived from 1-butene was determined.

(2) Content of structural units derived from ethylene (unit: % by weight)

By a conventional method using an infrared spectrophotometer and a standard sample, the content of structural units derived from ethylene was determined from characteristic absorptions appearing within the range from 732 to 720 $cm^{-1}$.

(3) Intrinsic viscosity ([η]; unit: dl/g) The intrinsic viscosity was measured at 135° C. in tetralin using an Ubbelohde's viscometer.

(4) Content of 20° C. xylene-soluble portion (CXS) (unit: % by weight)

One gram of polymer composition was dissolved completely in 100 ml of boiling xylene and then cooled to 20° C. After being left for four hours, the mixture was separated by filtration into a solid and a solution. The filtrate was evaporated and was dried under reduced pressure at 70° C., yielding a dry solid. The dry solid was weighed and then the content of 20° C. xylene-soluble portion (CXS) in the polymer composition was determined.

(5) Melt flow rate (MFR; unit: g/10 minutes)

The MFR was determined according to JIS K 7210 at a temperature of 230° C. under a load of 21.18 N.

(6) Melting point (Tm; unit: ° C.)

A polymer composition was subjected to hot press molding including operations [1] through [5] shown below, yielding a sheet 0.5 mm in thickness.

[1] To introduce a mass of polymer composition into a molding section controlled to 230° C. in a compression molding machine manufactured by Shinto Metal Industries, Ltd.

[2] To preheat the polymer composition to 230° C. in the molding section for five minutes without application of load.

[3] To increase the pressure applied to the mass of polymer composition up to 50 kgf/cm² in three minutes using a pressing machine.

[4] To keep the pressure at 50 kgf/cm² for two minutes.

[5] To transfer the sample obtained in step [4] above to a molding section controlled to 30° C. in another compression molding machine manufactured by Shinto Metal Industries, Ltd. and to press the sample under a pressure of 30 kgf/cm² for five minutes.

Using a differential scanning calorimeter (Model DSC-7, manufactured by PerkinElmer Inc.), a 10 mg portion taken from the pressed sheet was subjected to a thermal hysteresis including the operations (i) through (vii) shown below under a nitrogen atmosphere. During the step (vii), a fusion curve was produced. In the resulting fusion curve, a temperature (°

C.) where the highest endothermic curve appears was determined. The temperature was used as the melting point of the polymer composition.

(i) To heat a sample from room temperature to 220° C. at a rate of 300° C./min.

(ii) To hold the sample at 220° C. for five minutes.

(iii) To cool the sample from 200° C. to 150° C. at a rate of 300° C./min.

(iv) To hold the sample at 150° C. for one minute.

(v) To cool the sample from 150° C. to 50° C. at a rate 5° C./min.

(vi) To hold the sample at 50° C. for one minute.

(vii) To heat the sample from 50° C. to 180° C. at a rate of 5° C./min.

(7) Transparency (Haze; unit: %)

The haze was measured according to JIS K 7105.

(8) Heat seal temperature (HST; unit: ° C.)

Two pieces of the same film composed of a surface layer and a substrate layer were laminated in a manner that the surface layer of one piece was put on the surface layer of the other piece. The laminated pieces were pressed under a load of 2 kgf/cm$^2$ for two seconds by means of a heat sealer (manufactured by Toyo Seiki Seisaku-sho, Ltd.) heated to a predetermined temperature, thereby being heat sealed. The resulting sample was conditioned overnight at a temperature of 23° C. at a humidity of 50%. Then, the sample was measured for a peel resistance by peeling the laminated layers under the following conditions: a temperature of 23° C., a humidity of 50%, a peel speed of 200 mm/min and a peel angle of 180°. The heat sealing and the peel test were repeated while the seal temperature was varied and a seal temperature at which a peel resistance of 300 g/25 mm was achieved was determined. The seal temperature was used as the heat seal temperature (HST) of the film.

(9) Hot tack strength (HT; unit: g/75 mm)

Two 75 mm-wide pieces of the same film composed of a surface layer and a substrate layer were laminated in a manner that the surface layer of one piece was put on the surface layer of the other piece. The laminated pieces were pressed under a load of 2 kg/cm$^2$ for two seconds by means of a heat sealer heated to a predetermined temperature, thereby being heat sealed. Just after the load was removed, a peel force was applied to the sealed portion using a leaf spring, thereby allowing the surface layers to peel from each other. The peel length was measured.

The peel test described above was repeated at different peel forces using leaf springs different in spring constant and a peel force resulting in a peel length of 3.2 mm was determined. The spring constants of the leaf springs used were 53 g, 77 g, 110 g, 154 g, 224 g, 250 g and 295 g.

(10) Tackiness of film during its formation

A film which had been biaxially stretched and then passed through an oven having a preheating section controlled to 175° C. and 165° C., a stretching section controlled to 157° C. and a heat-setting section controlled to 165° C. was touched with fingers. When no tackiness was felt, the film was judged to be "good." Conversely, when a much degree of tackiness was felt, the film was judged to be "poor."

Example 1

[Polymer (A-1)]

A solid catalyst was prepared and polymerization was carried out in the same manner as Example 1 disclosed in JP-A-2002-069143. Thus, a powder (A) of a propylene-1-butene copolymer having a content of structural units derived from 1-butene of 24.6% by weight and an MFR of 2.2 g/10 minutes was obtained. To 100 parts by weight of the resulting powder (A), 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.25 part by weight of an MFR regulator were mixed. The resulting mixture was melt kneaded at 220° C. and then extruded through an extruder. The strand-shaped extrudate was cooled and cut. Thus, polymer (A-1) having an MFR of 10.3 g/10 minutes in the form of pellets was obtained. The MFR regulator used was a masterbatch composed of polypropylene powder impregnated with 8% by weight of 2,5-dimethyl-2,5-bis(tert-butylperoxy)hexane.

[Polymer (B-1)]

TAFMER BL3080 (1-butene-ethylene copolymer manufactured by Mitsui Chemicals, Inc.; [η]=2.56 dl/g, Tm=79° C.)

[Polymer Composition (1)]

Ninety percent by weight of the polymer (A-1) prepared above and 10% by weight of TAFMER BL3080 (i.e., polymer (B-1)) were mixed. The resulting mixture was melt kneaded at 220° C. and then extruded through an extruder. The strand-shaped extrudate was cooled and cut. Thus, polymer composition (1) in the form of pellets was obtained. Polymer composition (1) had an MFR of 7.9 g/10 minutes and it contained CXS in an amount of 28.3% by weight. The [η]CXS was 1.65 dl/g. The constitution, CXS and [η]CXS of polymer composition (1) are shown in Table 1.

[Preparation of Drawn Film]

A drawn film having a surface layer and a substrate layer was produced in the manner described below.

Polymer composition (1) prepared above was used for forming the surface layer. Polypropylene FS2011DG2 manufactured by Sumitomo Chemical Co., Ltd. (melting point=159° C., MFR=2.5 g/10 minutes) was used for forming the substrate layer. In separate extruders, polymer composition (1) and FS2011DG2 were melt kneaded separately at 230° C. and 260° C., respectively, and then were charged into a coextrusion T die. The extrudate having a two-kind two-layer structure, namely a surface layer/substrate layer structure, extruded through the T die was cooled rapidly to 30° C. and solidified on a chill roll. Thus, a cast sheet 1 mm in thickness was obtained.

The resulting cast sheet was preheated and then was stretched five times in the longitudinal direction at a stretching temperature of 145° C. by the action of difference in peripheral speed between rolls of a longitudinal stretching machine. Subsequently, the sheet was stretched eight times in the transverse direction at a stretching temperature of 157° C. in an oven and then was subjected to heat treatment at 165° C. Thus, a biaxially drawn multilayer film having a layer constitution: surface layer/substrate layer=1 μm/20 μm was obtained. The film was wound up by a winding machine. Physical properties of the biaxially drawn multilayer film are shown in Table 2.

Example 2

[Polymer (A-2)]

To 100 parts by weight of powder (A) of the propylene-1-butene copolymer obtained in Example 1, 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.22 part by weight of an MFR regulator the same as that used in Example 1 were mixed. The resulting mixture was melt kneaded at 220° C. and then extruded through an extruder. The strand-shaped extrudate was cooled and cut. Thus, polymer (A-2) having an MFR of 8.5 g/10 minutes in the form of pellets was obtained.

[Polymer (B-2)]

TAFMER BL3110 (1-butene-ethylene copolymer manufactured by Mitsui Chemicals, Inc.; $[\eta]$=1.79 dl/g, Tm=100.7° C.)

[Preparation of Polymer Composition (2) and Drawn Film]

Ninety percent by weight of the polymer (A-2) prepared above and 10% by weight of TAFMER BL3110 (polymer (B-2)) were mixed. The resulting mixture was melt kneaded at 220° C. and then extruded through an extruder. The strand-shaped extrudate was cooled and cut. Thus, polymer composition (2) in the form of pellets was obtained. The polymer composition (2) had an MFR of 8.6 g/10 minutes and it contained CXS in an amount of 28.2% by weight. The $[\eta]$CXS was 1.40 dl/g. The constitution, CXS and $[\eta]$CXS of polymer composition (2) are shown in Table 1.

A biaxially drawn multilayer film was produced in the same manner as Example 1 except the polymer composition (1) used for forming the substrate layer was changed to the polymer composition (2). Physical properties of the biaxially drawn multilayer film are shown in Table 2.

Comparative Example 1

[Polymer (A-3)]

To 100 parts by weight of powder (A) of the propylene-1-butene copolymer obtained in Example 1, 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.21 part by weight of an MFR regulator the same as that used in Example 1 were mixed. The resulting mixture was melt kneaded at 220° C. and then extruded through an extruder. The strand-shaped extrudate was cooled and cut. Thus, polymer (A-3) having an MFR of 7.8 g/10 minutes in the form of pellets was obtained.

[Polymer (B-3)]

TAFMER BL3450 (1-butene-ethylene copolymer manufactured by Mitsui Chemicals, Inc.; $[\eta]$=1.35 dl/g, Tm=94.7° C.)

[Preparation of Polymer Composition (3) and Drawn Film]

Ninety percent by weight of the polymer (A-3) prepared above and 10% by weight of TAFMER BL3450 (i.e., polymer (B-3)) were mixed The resulting mixture was melt kneaded at 220° C. and then extruded through an extruder. The strand-shaped extrudate was cooled and cut. Thus, polymer composition (3) in the form of pellets was obtained. The polymer composition (3) had an MFR of 8.3 g/10 minutes and it contained CXS in an amount of 28.2% by weight. The $[\eta]$CXS was 1.28 dl/g. The constitution, CXS and $[\eta]$CXS of polymer composition (2) are shown in Table 1.

A biaxially drawn multilayer film was produced in the same manner as Example 1 except the polymer composition (1) used for forming the substrate layer was changed to the polymer composition (3). Physical properties of the biaxially drawn multilayer film are shown in Table 2.

TABLE 1

| | Polymer (A) | | Polymer (B) | | | |
|---|---|---|---|---|---|---|
| | Kind | Content (%) | Kind | Content (%) | CXS (%) | $[\eta]$CXS (dl/g) |
| Example 1 | A-1 | 90 | B-1 | 10 | 28.3 | 1.65 |
| Example 2 | A-2 | 90 | B-2 | 10 | 28.2 | 1.40 |
| Comparative Example 1 | A-3 | 90 | B-3 | 10 | 28.2 | 1.28 |

TABLE 2

| | Haze (%) | HST (° C.) | HT(g/75 mm) | | | | | | |
|---|---|---|---|---|---|---|---|---|---|
| | | | 90° C. | 100° C. | 110° C. | 120° C. | 130° C. | 140° C. | 150° C. |
| Example 1 | 2.4 | 80 | <53 | 130 | 197 | 295< | 288 | 113 | <53 |
| Example 2 | 2.5 | 81 | <53 | 119 | 178 | 269 | 268 | 108 | <53 |
| Comparative Example 1 | 2.4 | 79 | <53 | 108 | 138 | 233 | 164 | 61 | <53 |

Examples 1 and 2, which satisfy the requirements of the present invention, are superior in low-temperature heat sealability, hot tack property and transparency.

Conversely, in Comparative Example 1, which does not satisfy one of the requirements of the present invention regarding the intrinsic viscosity ($[\eta]$ CXS) of 20° C. xylene-soluble portion of a polymer composition, an insufficient hot tack strength was obtained.

Example 3

[Polymer (A-4)]

To 100 parts by weight of powder (A) of the propylene-1-butene copolymer obtained in Example 1, 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.21 part by weight of an MFR regulator the same as that used in Example 1 were mixed. The resulting mixture was melt kneaded at 220° C. and then extruded through an extruder. The strand-shaped extrudate was cooled and cut. Thus, polymer (A-4) having an MFR of 7.9 g/10 minutes in the form of pellets was obtained.

[Polymer (B-1)]

TAFMER BL3080 (1-butene-ethylene copolymer manufactured by Mitsui Chemicals, Inc.; $[\eta]$=2.56 dl/g, Tm=79° C.)

[Polymer (D-1)]

Propylene homopolymer (Tm=164° C., MFR=140 g/10 minutes)

[Polymer Composition (4)]

Eighty-five parts by weight of the polymer (A-4) prepared above, 10 parts by weight of TAFMER BL3080 (i.e., polymer (B-1)) and 5 parts by weight of the aforementioned polymer (D-1) were mixed. The resulting mixture was melt kneaded at 220° C. and then extruded through an extruder. The strand-shaped extrudate was cooled and cut. Thus, polymer composition (4) in the form of pellets was obtained.

In the resulting polymer composition (4), the proportions of polymer (A-4) and polymer (B-1) were 89.5% by weight and 10.5% by weight, respectively. The content, based on 100 parts by weight of polymers (A-4) and (B-1) in total, of polymer (D-1) was 5.26 parts by weight.

Polymer composition (4) had an MFR of 6.3 g/10 minutes and it contained CXS in an amount of 25.0% by weight. The [η]CXS was 1.77 dl/g. The constitution, CXS and [η]CXS of polymer composition (4) are shown in Table 3.

[Preparation of Drawn Film]

A drawn film having a surface layer and a substrate layer was produced in the manner described below. Polymer composition (4) prepared above was used for forming the surface layer. Polypropylene FS2011DG2 manufactured by Sumitomo Chemical Co., Ltd. (melting point=159° C., MFR=2.5 g/10 minutes) was used for forming the substrate layer. Polymer composition (4) and FS2011DG2 were melt kneaded separately in separate extruders, and then were charged into a coextrusion T die. The extrudate having a two-kind two-layer structure, namely a surface layer/substrate layer structure, extruded through the T die was cooled rapidly to 30° C. and solidified on a chill roll. Thus, a cast sheet 1 mm in thickness was obtained.

The resulting cast sheet was preheated and then was stretched five times in the longitudinal direction at a stretching temperature of 145° C. by the action of difference in peripheral speed between rolls of a longitudinal stretching machine. Subsequently, the sheet was stretched eight times in the transverse direction at a stretching temperature of 157° C. in an oven and then was subjected to heat treatment at 165° C. Thus, a biaxially drawn multilayer film having a layer constitution: surface layer/substrate layer=1 μm/20 μm was obtained. The film was wound up by a winding machine. Physical properties of the biaxially drawn multilayer film are shown in Table 4.

Example 4

[Polymer (A-5)]

To 100 parts by weight of powder (A) of the propylene-1-butene copolymer obtained in Example 1, 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.21 part by weight of an MFR regulator the same as that used in Example 1 were mixed. The resulting mixture was melt kneaded at 220° C. and then extruded through an extruder. The strand-shaped extrudate was cooled and cut. Thus, polymer (A-5) having an MFR of 7.9 g/10 minutes in the form of pellets was obtained.

[Polymer (B-2)]

TAFMER BL3110 (1-butene-ethylene copolymer manufactured by Mitsui Chemicals, Inc.; [η]=1.79 dl/g, Tm=100.7° C.)

[Preparation of Polymer Composition (5) and Drawn Film]

Eighty-five percent by weight of the polymer (A-5) prepared above, 10 parts by weight of TAFMER BL3110 (i.e., polymer (B-2)) and 5 parts by weight of the aforementioned polymer (D-1) were mixed. The resulting mixture was melt kneaded at 220° C. and then extruded through an extruder. The strand-shaped extrudate was cooled and cut. Thus, polymer composition (5) in the form of pellets was obtained.

In the resulting polymer composition (5), the proportions of polymer (A-5) and polymer (B-2) were 89.5% by weight and 10.5% by weight, respectively. The content, based on 100 parts by weight of polymers (A-5) and (B-2) in total, of polymer (D-1) was 5.26 parts by weight.

The polymer composition (5) had an MFR of 7.8 g/10 minutes and it contained CXS in an amount of 23.7% by weight. The [η]CXS was 1.44 dl/g. The constitution, CXS and [η]CXS of polymer composition (5) are shown in Table 3.

A biaxially drawn multilayer film was produced in the same manner as Example 3 except the polymer composition (4) used for forming the substrate layer was changed to the polymer composition (5). Physical properties of the biaxially drawn multilayer film are shown in Table 4.

Example 5

[Polymer (C-1)]

To 100 parts by weight of propylene-ethylene-1-butene copolymer (content of structural units derived from ethylene=4.0% by weight, content of structural units derived from 1-butene=3.6% by weight, Tm=129° C., MFR=6.0 g/10 minutes), 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.75 part by weight of an MFR regulator the same as that used in Example 1 were mixed. The resulting mixture was melt kneaded at 220° C. and then extruded through an extruder. The strand-shaped extrudate was cooled and cut. Thus, polymer (C-1) having an MFR of 44 g/10 minutes in the form of pellets was obtained.

[Preparation of Polymer Composition (6) and Drawn Film]

Thirty percent by weight of the polymer (C-1) prepared above, 10 parts by weight of TAFMER BL3080 (i.e., polymer (B-1), 5 parts by weight of polymer (D-1), 55 parts by weight of powder (A) of the propylene-1-butene copolymer used in Example 1 and moreover, based on 100 parts by weight of these four components in total, 0.055 part by weight of calcium stearate, 0.0275 part by weight of Irganox 1010 (manufactured by Ciba Specialty Chemicals), 0.055 part by weight of 2,6-di-tert-butyl-4-methylphenol (BHT manufactured by Sumitomo Chemical Co., Ltd.) and 0.22 part by weight of Tospearl 120 (manufactured by GE Toshiba Silicones) were mixed. The resulting mixture was melt kneaded at 220° C. and then extruded through an extruder. The strand-shaped extrudate was cooled and cut. Thus, polymer composition (6) in the form of pellets was obtained.

In the resulting polymer composition (6), the proportions of powder (A), polymer (B-1) and polymer (C-1) were 57.9% by weight, 10.5% by weight and 31.6% by weight, respectively. Moreover, the content of polymer (D-1) was 5.26 parts by weight based on 100 parts by weight of powder (A), polymer (B-1) and polymer (C-1) in total.

The polymer composition (6) had an MFR of 6.4 g/10 minutes and it contained CXS in an amount of 22.8% by weight. The [η]CXS was 1.69 dl/g. The constitution, CXS and [η]CXS of polymer composition (6) are shown in Table 3.

A biaxially drawn multilayer film was produced in the same manner as Example 3 except the polymer composition (4) used for forming the substrate layer was changed to the polymer composition (6). Physical properties of the biaxially drawn multilayer film are shown in Table 4.

Comparative Example 2

[Polymer (B-3)]

TAFMER BL3450 (1-butene-ethylene copolymer manufactured by Mitsui Chemicals, Inc.; [η]=1.35 dl/g, Tm=94.7° C.)

[Preparation of Polymer Composition (7) and Drawn Film]

To 90 parts by weight of powder (A) of the propylene-1-butene copolymer obtained in Example 1 and 10 parts by weight of TAFMER BL3450 (i.e., polymer (B-3)), 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.12 part by weight of an MFR regulator the same as that used in Example 1 were mixed. The resulting mixture was melt kneaded at 220° C. and then extruded through an extruder. The strand-shaped extrudate was cooled and cut. Thus, polymer composition (7) in the form of pellets was obtained.

In the resulting polymer composition (7), the proportions of powder (A) and polymer (B-3) were 90% by weight and 10% by weight, respectively.

The polymer composition (7) had an MFR of 8.7 g/10 minutes and it contained CXS in an amount of 27.8% by weight. The [η]CXS was 1.19 dl/g. The constitution, CXS and [η]CXS of polymer composition (7) are shown in Table 3.

A biaxially drawn multilayer film was produced in the same manner as Example 3 except the polymer composition (4) used for forming the substrate layer was changed to the polymer composition (7). Physical properties of the biaxially drawn multilayer film are shown in Table 4.

Comparative Example 3

[Polymer Composition (8)]

To 85 parts by weight of powder (A) of the propylene-1-butene copolymer obtained in Example 1, 10 parts by weight of TAFMER BL3450 (polymer (B-3)) and 5 parts by weight of polymer (D-1), 0.1 part by weight of calcium stearate, 0.05 part by weight of Irganox 1010 (manufactured by Ciba Specialty Chemicals), 0.1 part by weight of 2,6-di-tert-butyl-4-methylphenol (BHT manufactured by Sumitomo Chemical Co., Ltd.), 0.4 part by weight of Tospearl 120 (manufactured by GE Toshiba Silicones) and 0.11 part by weight of an MFR regulator the same as that used in Example 1 were mixed. The resulting mixture was melt kneaded at 220° C. and then extruded through an extruder. The strand-shaped extrudate was cooled and cut. Thus, polymer composition (8) in the form of pellets was obtained.

In the resulting polymer composition (8), the proportions of powder (A) and polymer (B-3) were 89.5% by weight and 10.5% by weight, respectively. Moreover, the content of polymer (D-1) was 5.26 parts by weight based on 100 parts by weight of powder (A) and polymer (B-3) in total.

The polymer composition (8) had an MFR of 6.8 g/10 minutes and it contained CXS in an amount of 24.5% by weight. The [η]CXS was 1.21 dl/g. The constitution, CXS and [η]CXS of polymer composition (8) are shown in Table 3.

A biaxially drawn multilayer film was produced in the same manner as Example 3 except the polymer composition (4) used for forming the substrate layer was changed to the polymer composition (8). Physical properties of the biaxially drawn multilayer film are shown in Table 4.

TABLE 3

| | Polymer (A) | | Polymer (B) | | Polymer (D-1) | Polymer (C-1) | | |
|---|---|---|---|---|---|---|---|---|
| | Kind | Content (%) | Kind | Content (%) | Content (%) | Content (%) | CXS (%) | [η]CXS (dl/g) |
| Example 3 | A-4 | 85 | B-1 | 10 | 5 | 0 | 25.0 | 1.77 |
| Example 4 | A-5 | 85 | B-2 | 10 | 5 | 0 | 23.7 | 1.44 |
| Example 5 | Powder (A) | 55 | B-1 | 10 | 5 | 30 | 22.8 | 1.69 |
| Comparative Example 2 | Powder (A) | 90 | B-3 | 10 | 0 | 0 | 27.8 | 1.19 |
| Comparative Example 3 | Powder (A) | 85 | B-3 | 10 | 5 | 0 | 24.5 | 1.21 |

TABLE 4

| | Haze (%) | HST (° C.) | HT(g/75 mm) | | | | | | | Tackiness |
|---|---|---|---|---|---|---|---|---|---|---|
| | | | 90° C. | 100° C. | 110° C. | 120° C. | 130° C. | 140° C. | 150° C. | |
| Example 3 | 2.5 | 84 | <53 | 120 | 157 | 160 | 178 | 107 | <53 | good |
| Example 4 | 2.6 | 85 | <53 | 90 | 113 | 116 | 113 | 73 | <53 | good |
| Example 5 | 2.8 | 85 | <53 | 60 | 104 | 131 | 185 | 94 | <53 | good |
| Comparative Example 2 | 2.5 | 81 | <53 | 75 | 68 | 196 | 158 | 67 | <53 | poor |
| Comparative Example 3 | 2.9 | 84 | <53 | 53 | 53 | 53 | 113 | 71 | <53 | good |

Examples 3 through 5, which satisfy the requirements of the present invention, are superior in low-temperature heat sealability, hot tack property and transparency tackiness was not recognized.

Conversely, in Comparative Example 2, which does not contain polymer (D) that is one of the requirements of the present invention, a much degree of tackiness was recognized. In Comparative Example 1, which does not satisfy one of the requirements of the present invention regarding the intrinsic viscosity ($[\eta]$CXS) of 20° C. xylene-soluble portion of a polymer composition, an insufficient hot tack strength was obtained.

As described in detail above, according to the present invention, one can obtain a polymer composition from which a film superior in low-temperature heat sealability, hot tack property and transparency can be afforded and also can obtain a film thereof. In addition, according to the present invention, one can obtain a polymer composition from which films superior in low-temperature heat sealability, hot tack property and transparency can be obtained and which exhibit less tackiness when being fabricated into films can be afforded and also one can obtain a film thereof.

What is claimed is:

1. A polymer composition comprising:
   from 70 to 99% by weight of a polymer (A) satisfying Requirements (A-1) through (A-3) defined below and
   from 1 to 30% by weight of a polymer (B) satisfying Requirements (B-1) and (B-2) defined below, the polymer composition satisfying Requirements (1) and (2) defined below, wherein said amounts of the polymers (A) and (B) are based on a combined amount of the polymers (A) and (B):
   Requirement (1): the content of a 20° C. xylene-soluble portion of the polymer composition is from 5 to 45% by weight,
   Requirement (2): a 20° C. xylene-soluble portion of the polymer composition has an intrinsic viscosity of 1.3 dl/g or higher,
   Requirement (A-1): the polymer is a copolymer of propylene and α-olefin having 4 or more carbon atoms or a copolymer of propylene, α-olefin having 4 or more carbon atoms and ethylene,
   Requirement (A-2): the polymer has a content of structural units derived from α-olefin having 4 or more carbon atoms of from 3 to 40% by weight,
   Requirement (A-3): the polymer has a content of structural units derived from ethylene of from 0.1 to 5% by weight when the polymer is a copolymer of propylene, α-olefin having 4 or more carbon atoms and ethylene,
   Requirement (B-1): the polymer is a homopolymer of 1-butene, a copolymer of 1-butene and ethylene, a copolymer of 1-butene and propylene, a copolymer of 1-butene and α-olefin having 4 or more carbon atoms other than 1-butene, a copolymer of 1-butene, ethylene and propylene or a copolymer of 1-butene, ethylene and α-olefin having 4 or more carbon atoms other than 1-butene, and
   Requirement (B-2): the polymer has a melting point of not lower than 60° C. but lower than 125° C., and
   wherein polymer (A) is a polymer containing from 1 to 30% by weight of a segment (a-1) defined below and from 70 to 99% by weight of a segment (a-2) defined below, wherein the amounts of the segments are based on the combined weight of the segments:
   segment (a-1): a segment having structural units derived from 1-butene in a content of not less than 1% by weight but less than 15% by weight,
   segment (a-2): a segment having structural units derived from 1-butene in a content of not less than 15% by weight but not more than 40% by weight.

2. The polymer composition according to claim 1, wherein the polymer composition further comprises from 1 to 25 parts by weight, based on 100 parts by weight of the polymers (A) and (B) in total, of a polymer (D) satisfying Requirements (D-1), (D-2) and (D-3) defined below:
   Requirement (D-1): the polymer is a homopolymer of propylene, a copolymer of propylene and ethylene or a copolymer of propylene and α-olefin having 4 or more carbon atoms,
   Requirement (D-2): the polymer has a melting point of from 150° C. to 170° C., and
   Requirement (D-3): the polymer has a content of structural units derived from ethylene of from 0.1 to 3% by weight when the polymer is a copolymer of propylene and ethylene or the polymer has a content of structural units derived from α-olefin having 4 or more carbon atoms of from 0.1 to 3% by weight when the polymer is a copolymer of propylene and α-olefin having 4 or more carbon atoms.

3. The polymer composition according to any one of claims 1 or 2 wherein the polymer (A) is a copolymer of propylene and 1-butene.

4. The polymer composition according to claim 2, wherein the polymer (D) is a homopolymer of propylene having a melting point of from 155° C. to 170° C.

5. A film having at least one layer made of the polymer composition according to claim 1.

* * * * *